US012066992B2

(12) United States Patent
Elder et al.

(10) Patent No.: US 12,066,992 B2
(45) Date of Patent: *Aug. 20, 2024

(54) MAINTAINING A DATASET BASED ON PERIODIC CLEANSING OF RAW SOURCE DATA

(71) Applicant: Capital One Services, LLC, McLean, VA (US)

(72) Inventors: Brice Elder, Mishawaka, IN (US); Aditya Pai, San Francisco, CA (US); Julie Murakami, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,898

(22) Filed: Jan. 23, 2023

(65) Prior Publication Data

US 2023/0153281 A1 May 18, 2023

Related U.S. Application Data

(63) Continuation of application No. 17/164,199, filed on Feb. 1, 2021, now Pat. No. 11,567,915.

(51) Int. Cl.
*G06F 16/00* (2019.01)
*G06F 16/18* (2019.01)
(Continued)

(52) U.S. Cl.
CPC ........ *G06F 16/215* (2019.01); *G06F 16/1873* (2019.01); *G06F 16/2255* (2019.01); *G06F 16/2456* (2019.01)

(58) Field of Classification Search
CPC ............... G06F 16/1873; G06F 16/215; G06F 16/2255; G06F 16/2456
See application file for complete search history.

(56) References Cited

U.S. PATENT DOCUMENTS 9,274,956 B1 * 3/2016 Salyers ............... G06F 12/0808
10,007,690 B2 6/2018 Finkler
(Continued)

OTHER PUBLICATIONS

Houle M., "Data is King: Creating Greater Insights with Merchant Name Cleansing," Citi, Treasury and Trade Solutions, 2019, 2 pages. [Retrieved from https://lwww.citibank.com/tts/insights/articles/article93.html on Jan. 19, 2021].
(Continued)

*Primary Examiner* — Diedra McQuitery
(74) *Attorney, Agent, or Firm* — Harrity & Harrity, LLP

(57) ABSTRACT

In some implementations, a data cleaning platform may determine a respective entity key for each data record in a cleansed dataset based on a combination of fields, in each data record, that contain information that uniquely identifies an entity associated with a respective data record. The data cleaning platform may generate a delta dataset based on a set of uncleansed data records related to transactions that occurred after a time when the cleansed dataset was first generated. For example, in some implementations, each uncleansed data record in the delta dataset may be associated with a corresponding entity key based on the combination of fields. The data cleaning platform may perform a data join to update the cleansed dataset to include data records related to the transactions that occurred after the time when the cleansed dataset was first generated.

20 Claims, 5 Drawing Sheets

(51) Int. Cl.
*G06F 16/215* (2019.01)
*G06F 16/22* (2019.01)
*G06F 16/2455* (2019.01)

(56) References Cited

U.S. PATENT DOCUMENTS

| | | |
|---|---|---|
| 10,768,830 B1 | 9/2020 | Gade et al. |
| 2005/0131855 A1 | 6/2005 | Forman et al. |
| 2008/0027958 A1 | 1/2008 | Kapoor et al. |
| 2014/0032506 A1* | 1/2014 | Hoey .................... G06F 16/215 |
| | | 707/691 |
| 2015/0106578 A1 | 4/2015 | Warfield et al. |
| 2018/0307859 A1 | 10/2018 | LaFever et al. |
| 2020/0379952 A1 | 12/2020 | Wang et al. |
| 2020/0394166 A1* | 12/2020 | Vanhooser ............ G06F 16/221 |
| 2021/0374153 A1 | 12/2021 | Saxena et al. |
| 2022/0188660 A1* | 6/2022 | Schoenharl ........ G06Q 30/0202 |
| 2022/0197796 A1* | 6/2022 | Rumanek ............ G06F 12/0811 |
| 2022/0245103 A1 | 8/2022 | Elder et al. |

OTHER PUBLICATIONS

"Merchant Payment Cleansing," Segmint, 2020, 3 pages. [Retrieved from https://segmint.com/solutions/merchant-payment-cleansing on Jan. 19, 2021].

* cited by examiner

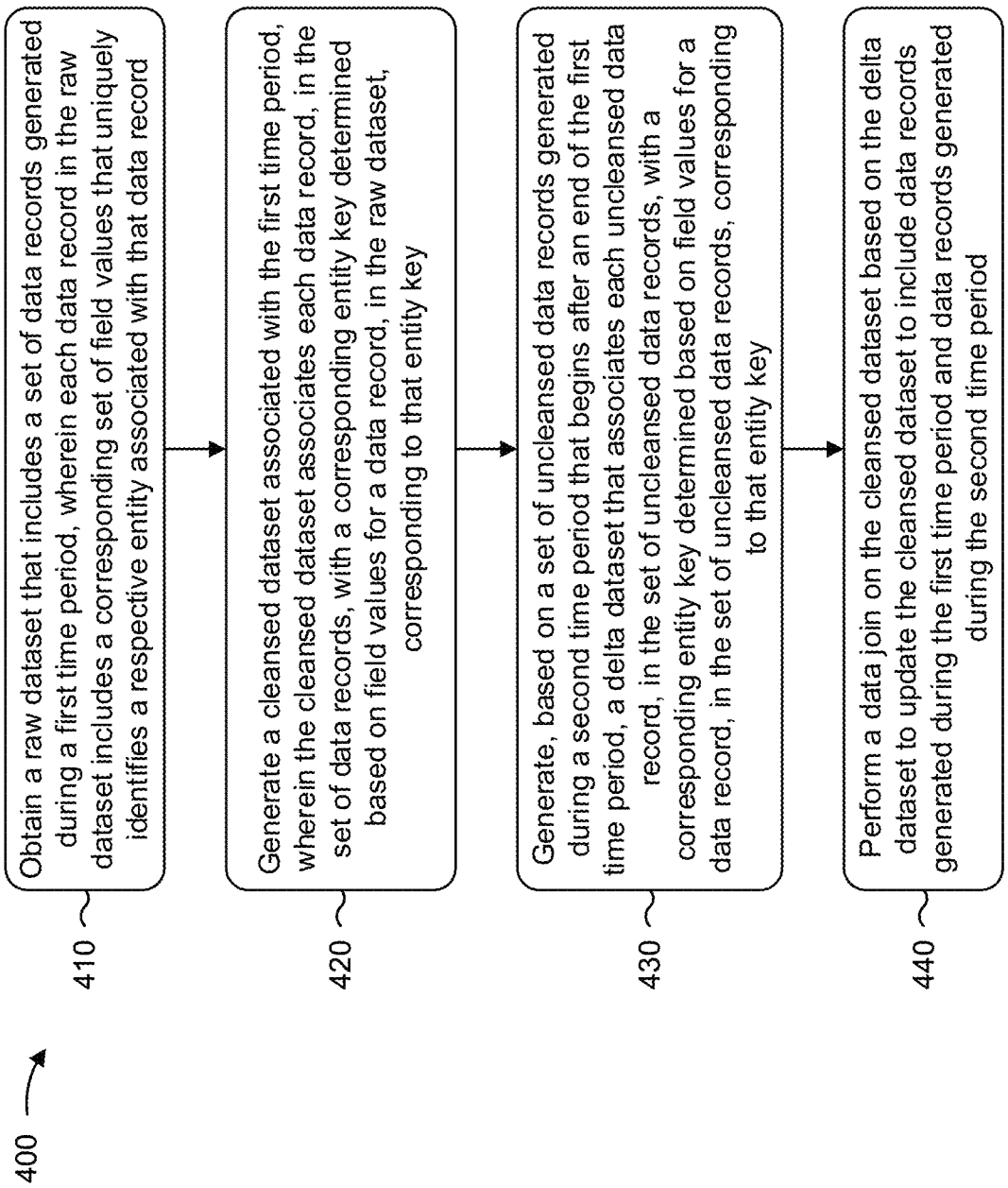

MAINTAINING A DATASET BASED ON PERIODIC CLEANSING OF RAW SOURCE DATA

RELATED APPLICATION

This application is a continuation of U.S. patent application Ser. No. 17/164,199, filed Feb. 1, 2021 (now U.S. patent. Ser. No. 11/567,915), which is incorporated herein by reference in its entirety.

BACKGROUND

Data cleansing (or data cleaning) generally refers to techniques to prepare a dataset for analysis by removing and/or modifying incorrect, incomplete, irrelevant, duplicated, corrupted, and/or improperly formatted data. The data that is removed and/or modified is typically not necessary or useful when performing data analytics because the data may hinder (e.g., slow down) data analytics processes and/or provide inaccurate results. Data cleansing techniques tend to focus on maximizing the validity, accuracy, completeness, consistency, and/or uniformity in a dataset without deleting relevant information. For example, in addition to removing data that may hinder data analytics and/or cause results to be inaccurate, data cleansing may involve fixing spelling and syntax errors, standardizing datasets, identifying duplicate data points, and/or correcting mistakes such as empty fields and/or missing codes. Accordingly, data cleansing typically has an overarching goal to create a dataset that is standardized and uniform such that data analytics tools can easily access, query, analyze, or otherwise interact with the dataset.

SUMMARY

In some implementations, a system for periodically cleansing raw source data includes one or more memories and one or more processors, communicatively coupled to the one or more memories, configured to: obtain a raw dataset that includes a set of data records generated during a first time period, wherein each data record in the raw dataset includes a corresponding set of field values that uniquely identifies a respective entity associated with that data record; generate a cleansed dataset associated with the first time period, wherein the cleansed dataset associates each data record, in the set of data records, with a corresponding entity key determined based on field values for a data record, in the raw dataset, corresponding to that entity key; generate, based on a set of uncleansed data records generated during a second time period that begins after an end of the first time period, a delta dataset that associates each uncleansed data record, in the set of uncleansed data records, with a corresponding entity key determined based on field values for a data record, in the set of uncleansed data records, corresponding to that entity key; and perform a data join to update the cleansed dataset to include data records generated during the first time period and data records generated during the second time period.

In some implementations, a method for maintaining a cleansed dataset includes determining, by a device, a respective entity key for each data record in a cleansed dataset based on a combination of fields, in each data record, that contain information that uniquely identifies an entity associated with a respective data record; generating, by the device, a delta dataset based on a set of uncleansed data records related to transactions that occurred after a time when the cleansed dataset was first generated, wherein each uncleansed data record in the delta dataset is associated with a corresponding entity key based on the combination of fields; and performing, by the device, a data join to update the cleansed dataset to include data records related to the transactions that occurred after the time when the cleansed dataset was first generated.

In some implementations, a non-transitory computer-readable medium storing a set of instructions includes one or more instructions that, when executed by one or more processors of a system, cause the system to: generate a cleansed dataset associated with a first time period, wherein the cleansed dataset associates each data record, in a set of data records, with a corresponding entity key based on a set of fields containing information that uniquely identifies an entity associated with each respective data record, and wherein the set of fields containing the information that uniquely identifies the entity associated with each respective data record includes one or more of a name field, a city field, a state field, a zip code field, a country field, or a category code field associated with the entity; generate, based on a set of uncleansed data records generated during a second time period that starts after an end of the first time period, a delta dataset that associates each uncleansed data record with a corresponding entity key based on the set of fields; and perform a data join to update the cleansed dataset to include data records associated with the first time period and data records associated with the second time period, wherein the delta dataset is generated and the data join is performed periodically to maintain a cleansed status for the data records that are generated after the end of the first time period.

BRIEF DESCRIPTION OF THE DRAWINGS

FIG. 4 is a flowchart of an example process relating to maintaining a dataset based on periodic cleansing of raw source data.

DETAILED DESCRIPTION

Figure 1A:
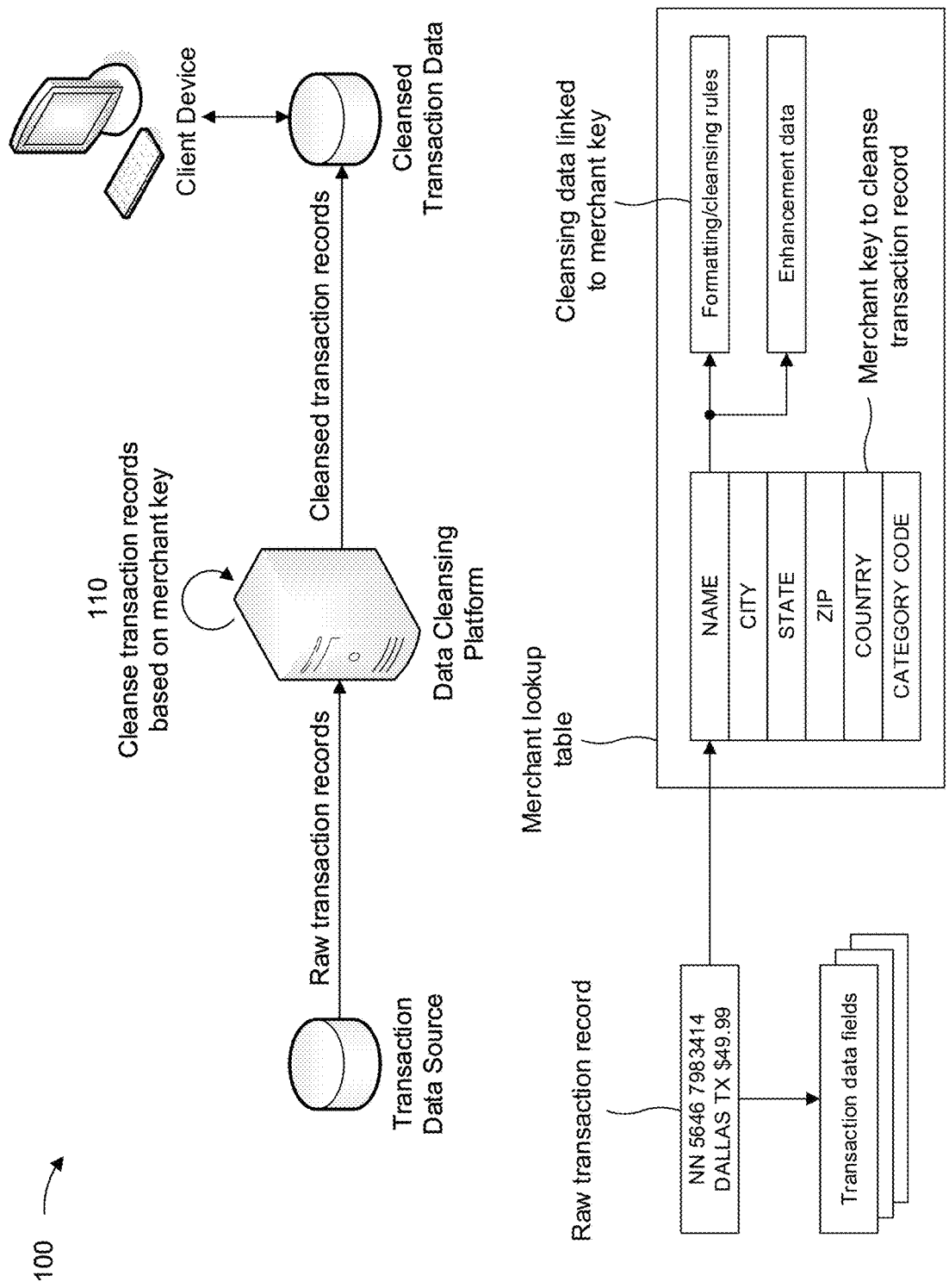
FIGS. 1A-1B are diagrams of an example implementation relating to maintaining a dataset based on periodic cleansing of raw source data.

The following detailed description of example implementations refers to the accompanying drawings. The same reference numbers in different drawings may identify the same or similar elements.

In data analytics systems, data quality generally refers to the overall utility of a dataset (e.g., an extent to which the dataset can be easily processed and/or analyzed for other uses). For example, the quality of a dataset may depend on characteristics such as validity (e.g., a degree to which the dataset conforms to defined rules or constraints), accuracy (e.g., a degree to which the dataset conforms to standard or true values), completeness (e.g., a degree to which all required data is known or otherwise expressed in the dataset), consistency (e.g., a degree to which data is consistent within the dataset and/or across different datasets), and/or uniformity (e.g., a degree to which data is specified or expressed using equivalent measures within and/or across datasets). In some cases, data cleansing techniques can be used to improve data quality. For example, as described above, data cleansing techniques may be used to remove and/or modify incorrect, incomplete, irrelevant, duplicated, corrupted, and/or improperly formatted data that may be unnecessary, not useful, and/or detrimental from a data analytics perspective.

For example, one area in which data cleansing techniques can be used to improve data quality involves data records related to merchant transactions, which typically include cryptic merchant attributes, non-descriptive or unintelligible content, and/or variations in transaction detail that can be difficult to map to a merchant identifier. The variations in transaction details, which can be widespread even for a single merchant (e.g., a large brand that may have thousands or millions of variations in how transaction details are presented), may cause difficulty or confusion with respect to distinguishing legitimate and fraudulent transactions. In addition, the variations may cause an increase in call center volume related to assisting customers with deciphering or resolving transaction data and/or interfere with data analytics processes to generate actionable intelligence based on customer spending and behavior patterns. Furthermore, transaction data is associated with very large data volumes, with credit card transactions often numbering in the thousands per second, millions per day, and billions annually. Accordingly, even in cases where data cleansing techniques can be applied to improve data quality in a dataset based on transaction records, the large data volumes are computationally taxing, which leads to long processing times (e.g., several days to cleanse all transactions that occurred in a previous year) and constrains the number of transactions that can be processed at a time. Furthermore, the large data volumes and long computation cycles limit how often transaction data can be cleansed, whereby a dataset based on cleansed transaction data essentially starts to decay and become stale as soon as the dataset is generated.

Some implementations described herein relate to a data cleansing platform that may maintain a dataset that includes cleansed transaction records by periodically cleansing raw transaction records obtained from one or more data sources. For example, in some implementations, the data cleansing platform may obtain raw transaction records that include raw transaction records associated with posted (e.g., cleared and/or fully processed) transactions and authorized (e.g., pending and/or partially processed) transactions over a given time period (e.g., the past year, the past six months, the past three months, and/or another suitable interval). The raw transaction records may each include one or more fields that identify a merchant associated with a corresponding transaction, and the data cleansing platform may determine a merchant key associated with each transaction record based on the one or more fields that identify the merchant for the corresponding transaction record. For example, the merchant key may generally include a combination of fields that uniquely identify a particular merchant, such as a merchant name, city, state, zip code, country, and/or category code, among other examples. In some implementations, the data cleansing platform may use the merchant key to transform the raw transaction records into a cleansed format, which may include standardized expressions for the merchant information. Furthermore, in some implementations, the merchant key may provide an index to enhancement data that provides more detailed and useful information about the merchant and/or the transaction, such as image data (e.g., a corporate logo), contact information (e.g., a phone number and/or website address), and location data (e.g., to identify the merchant location on a map), among other examples. Accordingly, the data cleansing platform may publish a dataset that includes cleansed transaction records over the given time period, making the cleansed dataset accessible to client devices and/or data analytics systems.

In some implementations, after generating the dataset that includes the cleansed transaction records over the given time period, the data cleansing platform may collect and cleanse raw transaction records based on previously uncleansed merchant keys (e.g., merchant keys that do not appear in the initial dataset). For example, merchant information typically does not change or changes infrequently, whereby previously identified merchants can be used to cleanse raw transaction records that share the same combination of fields that define the merchant key. Accordingly, the data cleansing platform may obtain or otherwise collect raw transaction records based on posted and/or authorized transactions on a periodic basis (e.g., daily, weekly, or at another interval that is generally shorter than the period associated with the initial cleansed dataset), and the data cleansing platform may generate a delta dataset that includes a set of previously uncleansed merchant identifiers. The data cleansing platform may then cleanse the previously uncleansed merchant identifiers in the delta dataset (e.g., generating a merchant key that includes merchant name, city, state, zip code, country, and category code fields represented in a standardized format), and the cleansed merchant identifiers may be published to a lookup table that can then be joined with the raw transaction records for the current period and subsequent periods.

In this way, by repeating the merchant cleansing technique for the delta dataset associated with each periodic interval, the data cleansing platform may maintain a cleansed transaction dataset in a timely manner (e.g., in contrast to existing techniques that generate enhanced merchant information only on a quarterly, semi-annual, or other long-term basis due to the computationally taxing process to cleanse several billion transaction records). In this way, each iteration of cleansing the delta dataset for the previous periodic interval may maintain the merchant lookup table in an accurate and up-to-date state (e.g., in contrast to existing techniques in which a merchant lookup table is accurate only for the transaction records in the corresponding time period and immediately becomes stale because the merchant lookup table would be static until the next merchant lookup table is generated). Furthermore, by periodically cleansing merchant identifiers based on new merchant keys that appear in the delta dataset, the data cleansing platform can then perform a data join operation to combine information associated with the cleansed merchant identifiers and information associated with the raw transaction records, which may save substantial computational resources (e.g., requiring fewer compute instances, load balancers, and/or network requests, among other examples) relative to cleansing a full load of transaction records for each periodic interval.

Figure 1B:
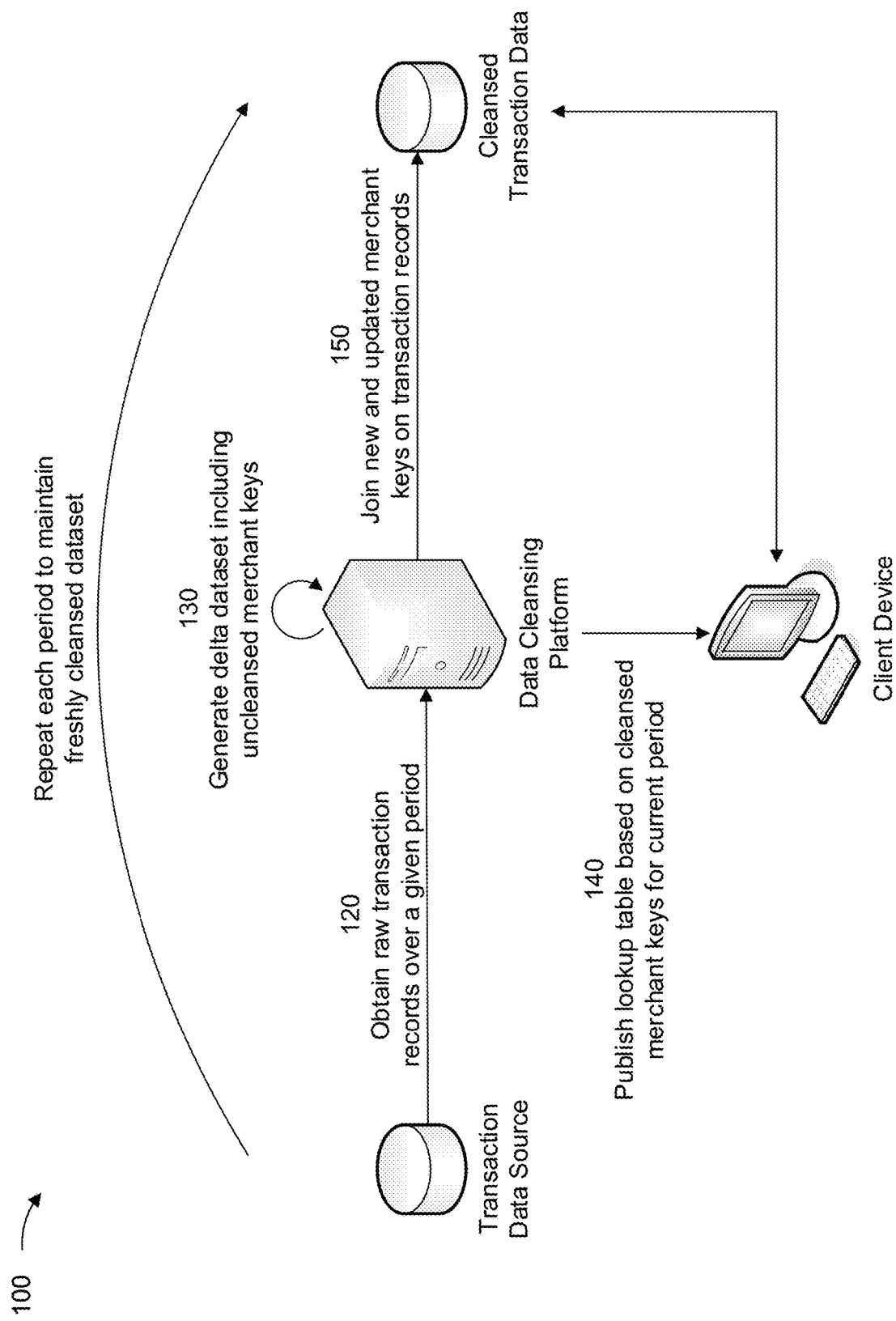

FIGS. 1A-1B are diagrams of an example 100 relating to maintaining a dataset based on periodic cleansing of raw source data. As shown in FIGS. 1A-1B, example 100 includes a transaction data source, a data cleansing platform, one or more data repositories, and a client device. For example, in some implementations, the transaction data source may store raw transaction records that relate to authorized and posted transactions, the data cleansing platform may extract or otherwise obtain the raw transaction records that relate to authorized and posted transactions from the transaction data source, the one or more data repositories may store information associated with transaction records that the data cleansing platform cleanses based on merchant keys, and the client device may view, analyze, or otherwise interact with the information stored in the one or more data repositories that relate to the cleansed transaction records. These devices are described in more detail below in connection with FIGS. 2-3.

As shown in FIG. 1A, and by reference number 110, the data cleansing platform may cleanse a set of raw transaction records based on a set of merchant keys. For example, in some implementations, the transaction data source may generally store raw transaction records, which may include historical information associated with posted transactions (e.g., transactions that have been authorized, fully processed, and charged to or otherwise associated with customer accounts by a transaction backend system associated with one or more financial institutions). In addition, the raw transaction records stored in the transaction data source may include information associated with authorized transactions (e.g., merchant-initiated and/or customer-initiated transactions that have been requested and authorized in the transaction backend system, and pending being charged to or otherwise associated with customer accounts).

In some implementations, as shown, each raw transaction record may be associated with various fields, which may include information related to the customer, the merchant, and the transaction between the customer and the merchant. For example, the various fields related to the customer may include a customer identifier, a cardholder name, a cardholder account number, and/or a card expiration date, among other examples. Furthermore, the fields related to the merchant may include a merchant name, address, city, state, zip code, country, and/or merchant category code (MCC) information (e.g., a category code group, category code number, and/or category code description) that categorizes the merchant into a market segment. For example, MCCs from 4000-4799 generally represent merchants that provide transportation services, MCCs from 5000-5599 represent merchants that provide retail outlet services, MCCs from 7300-7999 represent merchants that provide business services, and MCCs from 9000-9999 represent merchants that provide government services, among other examples. Furthermore, the fields related to the transaction may include an initial authorized amount, a final amount (e.g., accounting for a tip added to the authorized amount and/or other post-authorization processing), a date and/or time associated with the transaction, a location where the transaction occurred, a point-of-sale (POS) entry mode, and/or an approval code, among other examples.

In some implementations, as shown, the data cleansing platform may cleanse the raw transaction records obtained from the transaction data source using a set of merchant keys. For example, as described herein, a merchant key may generally include a combination of fields that is sufficient to uniquely identify a single merchant. For example, as shown, the merchant key may include a name, a city, a state, a zip code, a country, and a category code (e.g., an MCC) associated with the merchant. Accordingly, because merchant information typically does not change or changes infrequently, the information in the merchant key may be used to cleanse all transaction records that share the same combination of fields that define the merchant key. Furthermore, the merchant key may be used to distinguish different business locations for the same merchant (e.g., different retail locations and/or regional offices) and/or different businesses that a merchant may operate at a single location (e.g., at a superstore that includes grocery store associated with a first MCC and a pharmacy associated with a second MCC).

Accordingly, in some implementations, the data cleansing platform may analyze the raw transaction records to determine a merchant key associated with each raw transaction record, and the merchant key may be stored in a lookup table such that the merchant key provides an index to enhancement data (e.g., information associated with the merchant that is expressed using a standard format and/or additional information about the merchant that may not be included in the transaction records, among other examples). Accordingly, when cleansing raw transaction records, the data cleansing platform may identify the merchant key that corresponds to the merchant associated with each transaction record, and the corresponding enhancement data may be used in a data join operation to cleanse the raw transaction records. In particular, as described herein, a data join operation may refer to an operation used in relational databases to combine columns from separate tables. Accordingly, the data join operation that is performed to cleanse the raw transaction records may generally include creating a dataset in which one or more fields in the raw transaction records are combined, replaced, formatted and/or otherwise processed based on the enhancement data linked to the corresponding merchant identifier.

In some implementations, the lookup table may include one instance of each merchant key that is identified in the raw transaction records. Accordingly, the data cleansing platform may perform a data deduplication process to remove duplicate instances of a merchant key such that the lookup table includes no more than one instance of each merchant key. In some implementations, the data cleansing platform may then use the merchant keys stored in the lookup table to generate an initial cleansed dataset (e.g., a baseline cleansed dataset) based on the raw transaction records obtained from the transaction data source. For example, the data cleansing platform may determine a merchant key in the lookup table that includes a combination of fields (e.g., name, city, state, zip, country, and MCC) that matches a corresponding set of fields in the raw transaction record, and the data cleansing platform may generate a cleansed transaction record in which the raw transaction record is associated with the merchant key and/or enhancement data associated with the merchant key (e.g., a logo, website, phone number, and/or location, among other examples). For example, in some implementations, the data cleansing platform may perform a data join operation to combine and/or reformat information included in the various fields of the raw transaction records based on merchant information that is associated with the merchant keys stored in the lookup table. In this way, the data cleansing platform may generate a cleansed dataset in which each transaction record is associated with a corresponding merchant key and/or related enhancement data that is formatted in a manner that is easily deciphered by a human and/or structured in such a way to enable data analytics tools to query, analyze, and/or otherwise interact with the cleansed transaction data.

In this way, the data cleansing platform may reformat information in the raw transaction record that may be cryptic, indecipherable, and/or otherwise difficult to parse into a human-readable format. For example, the data cleansing platform may generate the cleansed transaction records as a service to a customer that interacts with the cleansed transaction records via the client device, which may enable customers to more easily decipher credit card statements and/or transaction histories, and/or to more readily and accurately identify fraudulent transactions, among other examples. Furthermore, the cleansed transaction records may be stored in the one or more data repositories using one or more schemas or data structures that enable data analytics to be performed on the cleansed dataset via the client device (e.g., to enable merchants to determine an average or total spend at a particular location and/or time of day, and/or to enable customers to integrate transaction data into budgeting tools, among other examples).

In some implementations, the data cleansing process shown in FIG. 1A may initially be performed to generate an initial or baseline cleansed dataset and a corresponding lookup table that includes merchant keys for cleansed transactions over a defined time period. For example, the data cleansing process shown in FIG. 1A may be computationally taxing, requiring significant computational resources (e.g., multiple cloud instances, servers, load balancers, and/or other resources) and a long processing time (e.g., multiple days of computation to cleanse billions of raw transaction records that may include many millions of different merchant keys). Accordingly, the data cleansing process may be limited to a defined time period (e.g., limiting the data cleansing to all authorized and posted transactions that have occurred within the past quarter, the past six months, the past year, and/or another suitable time period) in order to make the data cleansing process computationally feasible. However, gathering enhanced merchant information in the form of a lookup table on an infrequent (e.g., quarterly or semi-annual) basis using cleansed merchant keys for a limited time period (e.g., the past year) would result in the lookup table being accurate only for the transactions that occurred within the limited time period. Furthermore, the lookup table would be static until the lookup table is recreated and/or updated at the next data cleansing interval (e.g., three months or six months later). In other words, the lookup table would immediately become stale upon generation and become increasingly stale until the next data cleansing interval. Furthermore, the lookup table would not contain any new or updated merchant keys that appear in transaction records between data cleansing intervals.

Accordingly, as described herein, the data cleansing platform may be configured to maintain the cleansed dataset by periodically creating at least a first delta dataset that includes new and/or updated merchant keys that are identified from the raw transaction records that are generated after the cleansed dataset is initially created. Additionally, in some implementations, the data cleansing platform may create a second delta dataset that includes cleansed transaction records based on raw transaction records that are generated after the cleansed dataset is initially created. For example, the second delta dataset may be cleansed based on the new and/or updated merchant keys included in the first delta dataset. Additionally, or alternatively, a data join operation may be performed between the previously cleansed transaction records and the new and/or updated merchant keys such that the previously cleansed transaction records may be associated with current merchant information in cases where there is a change to the value(s) in one or more fields of the merchant key.

In some implementations, as shown in FIG. 1B, the delta dataset may be periodically generated daily, weekly, monthly, or according to another suitable interval that is significantly shorter than the quarterly, semi-annual, annual, and/or other time period associated with the transaction records initially included in the cleansed dataset. Additionally, or alternatively, the process shown in FIG. 1B to maintain the cleansed dataset may be performed in an event-driven manner (e.g., triggered when the number of uncleansed transaction records satisfies a threshold), at a scheduled time, and/or on-demand, among other examples. In this way, by obtaining raw transaction records to identify new and/or updated merchant keys on a periodic basis or over a duration that is much shorter than the time period associated with the initial cleansed dataset, the data cleansing platform may cleanse only the new and/or updated merchant keys that have not been observed in any previous iterations of the data cleansing process. Accordingly, merchant keys identified in the previous iteration(s) of the data cleansing process combined with the new and/or updated variations in the merchant keys (e.g., the merchant keys included in the delta dataset) may enable the data cleansing platform to maintain the cleansed dataset in a computationally feasible manner (e.g., using a small number of cloud instances, servers, load balancers, and/or other computational resources). Furthermore, the data cleansing platform may generate an updated lookup table that combines previously identified merchant keys with new and/or updated merchant variations, which may enable the data cleansing platform to perform a data join operation to maintain the cleansed dataset in a timely manner (e.g., processing millions of transaction records on a daily, weekly, or monthly basis within a few minutes to a few hours versus several days for transaction records that are cleansed on a quarterly, semi-annual, or annual basis). For example, after updating the lookup table to include new and/or updated merchant keys observed in the raw transaction records collected for the current period, the data cleansing platform may use the well-structured merchant information and/or enhancement data associated with all of the merchant keys identified in previous and/or current iterations of the data cleansing process to cleanse the raw transaction records for the current period. Furthermore, if any of the previously cleansed transaction records are associated with a merchant key that is updated based on the delta dataset, the data cleansing platform may update the previously cleansed transaction records.

For example, as shown in FIG. 1B, and by reference number 120, the data cleansing platform may obtain, from the transaction data source, raw transaction records over a given time period. For example, in cases where the data cleansing platform periodically generates the delta dataset that includes new and/or updated merchant keys (e.g., merchant keys that do not appear in the lookup table generated in the previous iteration(s) of the data cleansing process), the data cleansing platform may obtain posted and authorized transactions from the transaction data source based on a periodicity (e.g., all posted and authorized that occurred in a given day when the delta dataset that includes new and/or updated merchant keys is generated daily). In other examples, where the data cleansing platform generates the delta dataset with the new and/or updated merchant keys in an event-driven, scheduled, and/or on-demand manner, the data cleansing platform may obtain all posted and authorized transactions that occurred since the dataset of cleansed transactions was initially created or most recently updated.

As further shown in FIG. 1B, and by reference number 130, the data cleansing platform may generate the delta dataset that includes new and/or updated merchant keys for the given time period. For example, in some implementations, the delta dataset may generally include uncleansed merchant keys (e.g., new or updated merchant key variations) that have not yet been associated with formatted merchant information and/or relevant enhancement data. In other words, as described herein, uncleansed merchant keys may generally include any new and/or updated merchant keys that do not appear in the lookup table of merchant keys used to generate the initial or most recent cleansed dataset. For example, as described above, each raw transaction record obtained from the transaction data source may include, among other things, various fields to identify the merchant associated with the corresponding transaction. Among the various fields, a certain combination of fields may define a merchant key that represents a unique merchant identifier (e.g., a name, city, state, zip code, country, and MCC). Accordingly, the lookup table that was used to generate the initial or most recent cleansed dataset may include previously cleansed merchant keys that were used to cleanse the transaction records included in the initial or most recent cleansed dataset, and the data cleansing platform may determine, for each raw transaction record in the current time period, whether the merchant key associated with the raw transaction record already appears in the lookup table. In some implementations, when the merchant key associated with the raw transaction record already appears in the lookup table, the data cleansing platform does not add the merchant key to the delta dataset because the delta dataset includes only new and/or updated merchant keys. Furthermore, the data cleansing platform may store the information associated with the raw transaction record such that the raw transaction record can later be cleansed using the lookup table that includes the most current version of each unique merchant key. On the other hand, when the merchant key for a particular raw transaction record does not already appear in the lookup table that includes merchant keys identified in one or more previous iterations of the data cleansing process (e.g., the merchant key is a new or updated merchant key that the data cleansing platform has not previously observed), the data cleansing platform may add the merchant key for that raw transaction record to the delta dataset. Furthermore, the data cleansing platform may store the information associated with the raw transaction record such that the raw transaction record can later be cleansed using formatted merchant information and/or enhancement data associated with the corresponding merchant key.

Accordingly, in some implementations, the data cleansing platform may generate the delta dataset that includes all uncleansed (e.g., new and/or updated) merchant keys for the current period, and the data cleansing platform may associate each merchant key in the delta dataset with formatted merchant information and/or enhancement data that includes additional information related to the corresponding merchant. For example, in some implementations, the data cleansing platform may perform a data deduplication process to remove duplicate merchant keys from the delta dataset, which may occur due to different cloud instances, servers, computational threads, and/or other computational resources processing the raw transaction records in parallel (e.g., two threads may each process a raw transaction record that includes a new merchant key that was not identified in any previous iteration(s) of the data cleansing process, which may result in the delta dataset including two redundant instances of the new merchant key). In this way, the data cleansing platform may ensure that the delta dataset includes no more than one new and/or updated variation of a merchant key that does not already appear in the lookup table generated in the previous iteration(s) of the data cleansing process. Additionally, or alternatively, the data cleansing platform may transform and/or otherwise reformat the information contained in the raw transaction records for the corresponding merchants (e.g., according to a standardized schema or data structure used for the lookup table) and/or associate the new and/or updated merchant keys with enhancement data based on one or more attributes associated with a corresponding merchant (e.g., a website, a logo, and/or an alternate business name such as a "doing business as" (DBA) trade name, among other examples).

As further shown in FIG. 1B, and by reference number 140, the data cleansing platform may publish the lookup table based on the new and/or updated merchant keys included in the delta dataset associated with the current time period, thereby making the lookup table accessible to client devices. Furthermore, in some implementations, the data cleansing platform may store the lookup table based on the new and/or updated merchant key variations in internal and/or local storage to enable subsequent cleansing of transaction records. In some implementations, the lookup table that includes the new and/or updated merchant keys may be published separately from the lookup table used to generate the initial or most recent cleansed transaction dataset, or the data cleansing platform may publish a comprehensive lookup table that combines the new and/or updated merchant keys with merchant keys identified in the previous iteration(s) of the data cleansing process. In the latter case, where the data cleansing platform publishes a comprehensive lookup table with the most recent merchant keys observed across all iterations of the data cleansing process, the data cleansing platform may perform an additional data deduplication process to verify that the comprehensive lookup table includes no more than one variation of each unique merchant key (e.g., no two merchant keys in the lookup table share the same values in the combination of fields that define the merchant key).

As further shown in FIG. 1B, and by reference number 150, the data cleansing platform may perform a data join operation to update the cleansed transaction dataset based on the new or updated merchant key variations included in the published lookup table. For example, in some implementations, the data cleansing platform may determine, for each raw transaction record associated with the current time period, the merchant key associated with the raw transaction record. The data cleansing platform may then match the merchant key associated with the raw transaction record to a an existing merchant key identified in a previous iteration of the data cleansing process or a new or updated merchant key variation identified in the current iteration of the data cleansing process, and the matching merchant key may provide an index to formatted information associated with the corresponding merchant and/or enhancement data that includes additional attributes associated with the corresponding merchant. For example, in some implementations, the merchant key associated with the raw transaction record may be matched to an existing, new, or updated merchant key based on a combination of fields in the merchant key including values that match one or more corresponding fields in an existing, new, or updated merchant key. Additionally, or alternatively, the data cleansing platform may identify a match between two merchant keys only if the two merchant keys include the same values for all of the fields in the combination of fields that define the merchant key. Additionally, or alternatively, the data cleansing platform may utilize a machine learning model, a fuzzy matching algorithm, and/or other suitable techniques to determine whether a merchant key associated with a raw transaction record matches a cleansed merchant key when the combination of fields include a partial match and/or have one or more mismatching fields.

Accordingly, the data cleansing platform may associate the raw transaction record with an existing, new, and/or updated merchant key that can then be used to cleanse the raw transaction record. For example, in some implementations, the data cleansing platform may transform the various fields in the raw transaction record according to a schema or data structure that is used to represent attributes associated with each transaction, which may include attributes associated with the customer, the merchant, and the exchange (e.g., time, place, and amount) between the customer and the merchant. Furthermore, in some implementations, the data cleansing platform may update the merchant information associated with one or more transaction records that were cleansed in a previous iteration of the data cleansing process if there was an update to the merchant key associated with such transaction record(s) (e.g., the name, city, state, zip code, county, and/or MCC associated with the merchant key has changed). In this way, the new and/or updated merchant keys can be used in combination with the previously identified merchant keys to cleanse all of the raw transaction records obtained for the current period and to update the merchant information associated with one or more previously cleansed transaction records if the merchant key has changed.

In some implementations, the data cleansing platform may perform an additional data join operation on the raw transaction records that are cleansed for the current period and the transaction records that were cleansed in the previous iteration(s) of the data cleansing process. For example, as described above, the data join may generally include a relational database operation to combine data from different sources into one table or data structure. Accordingly, the data cleansing platform may perform the data join operation on the cleansed transaction records for the current period and the cleansed transaction records associated with the previous iteration(s) of the data cleansing process to generate a single dataset that includes all of the cleansed transaction records for the previous and current iterations of the data cleansing process. The single dataset of cleansed transaction records may be stored in one or more data repositories to enable data analytics to be performed on the cleansed dataset via the one or more client devices. In some implementations, the data cleansing for the raw transaction records associated with the current period and/or the data join operation to combine the cleansed transactions for the previous and current iterations of the data cleansing process may be performed according to the same periodicity as the process to generate the delta dataset that includes new and/or updated merchant keys (e.g., daily, weekly, bi-weekly, or monthly, among other examples). Alternatively, in some implementations, the periodicity associated with the cleansing the new raw transaction records and generating the single dataset of cleansed transactions may be longer than the periodicity associated with identifying the new and/or updated merchant keys (e.g., because cleansing transaction records may be more computationally taxing and/or time-consuming than identifying new or updated merchant key variations, and may therefore be performed less often to save resources).

Accordingly, by periodically obtaining a delta dataset that includes all new and/or updated merchant key variations and cleansing only the new and/or updated merchant keys, as described herein, generating or updating the lookup table based on only the new and/or updated merchant keys may be significantly less computationally taxing and time consuming compared to cleansing all merchant keys on a quarterly, semi-annual, or annual basis. In this way, the data cleansing platform may cleanse raw transaction records covering a relatively limited time period (e.g., a time period that begins after the most recent iteration of the data cleansing process) and/or update previously cleansed transaction records only if values have changed in one or more fields of the corresponding merchant key. In this way, the data cleansing platform may maintain the dataset of cleansed transactions in a fresh state relative to existing techniques in which cleansed transaction data immediately becomes stale and fail to reflect new and/or updated merchant information that is created after the transaction data is cleansed. Furthermore, by periodically repeating the data cleansing process based on one or more delta datasets (e.g., a delta dataset that includes only new and/or updated merchant keys and a delta dataset that includes new raw transaction records only), the data cleansing platform may ensure that the most current cleansed information (e.g., cleansed merchant keys and cleansed transaction records) are available to customers, data analytics tools, and/or other users that may have a need to keep up with new and changing patterns in transaction data. Furthermore, iteratively identifying new and/or updated merchant keys and iteratively cleansing raw transaction records is substantially less computationally taxing (e.g., requiring fewer compute instances, load balancers, and/or network requests, among other examples) relative to cleansing a full load of transaction records in each iteration.

As indicated above, FIGS. 1A-1C are provided as an example. Other examples may differ from what is described with regard to FIGS. 1A-1C.

Figure 2:
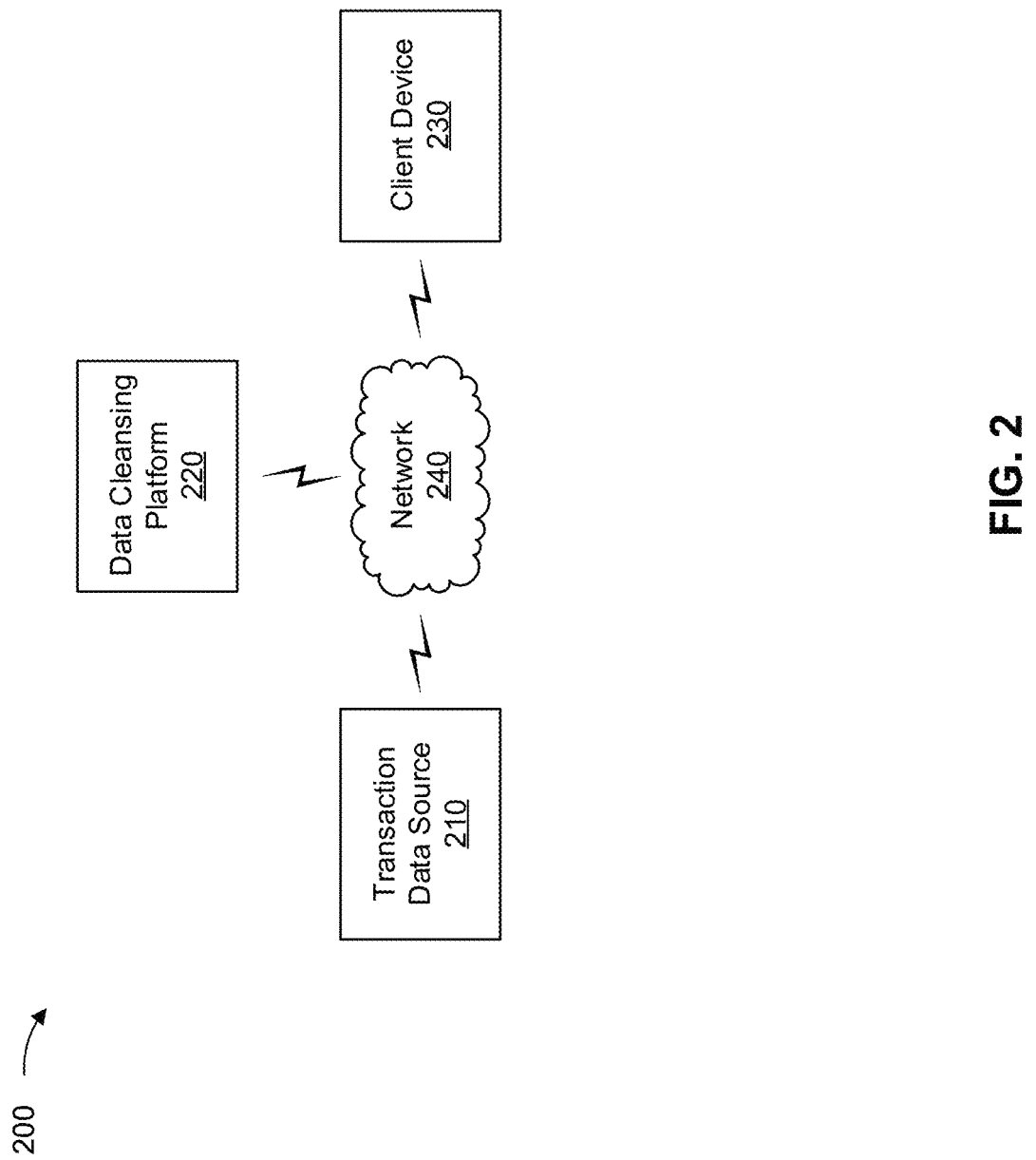
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a transaction data source 210, a data cleansing platform 220, a client device 230, and/or a network 240. Devices of environment 200 may interconnect via wired connections and/or wireless connections.

The transaction data source 210 includes one or more devices capable of receiving, generating, storing, processing, and/or providing information associated with one or more transactions (e.g., raw data records associated with posted transactions and/or authorized transactions), as described elsewhere herein. The transaction data source 210 may include a communication device and/or a computing device. For example, the transaction data source 210 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The transaction data source 210 may communicate with one or more other devices of environment 200, as described elsewhere herein.

The data cleansing platform 220 includes one or more devices capable of receiving, generating, storing, processing, providing, and/or routing information associated with a lookup table that includes a set of merchant keys and/or a cleansed dataset that includes information associated with transaction records that are each associated with a merchant key in the set of merchant keys, as described elsewhere herein. The data cleansing platform 220 may include a communication device and/or a computing device. For example, the data cleansing platform 220 may include a server, such as an application server, a client server, a web server, a database server, a host server, a proxy server, a virtual server (e.g., executing on computing hardware), or a server in a cloud computing system. In some implementations, the data cleansing platform 220 includes computing hardware used in a cloud computing environment.

The client device 230 includes one or more devices capable of receiving, generating, storing, processing, and/or providing information associated with a lookup table that includes a set of merchant keys and/or a cleansed dataset that includes information associated with transaction records that are each associated with a merchant key in the set of merchant keys, as described in more detail elsewhere herein. The client device 230 may include a communication device and/or a computing device. For example, the client device 230 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 240 includes one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
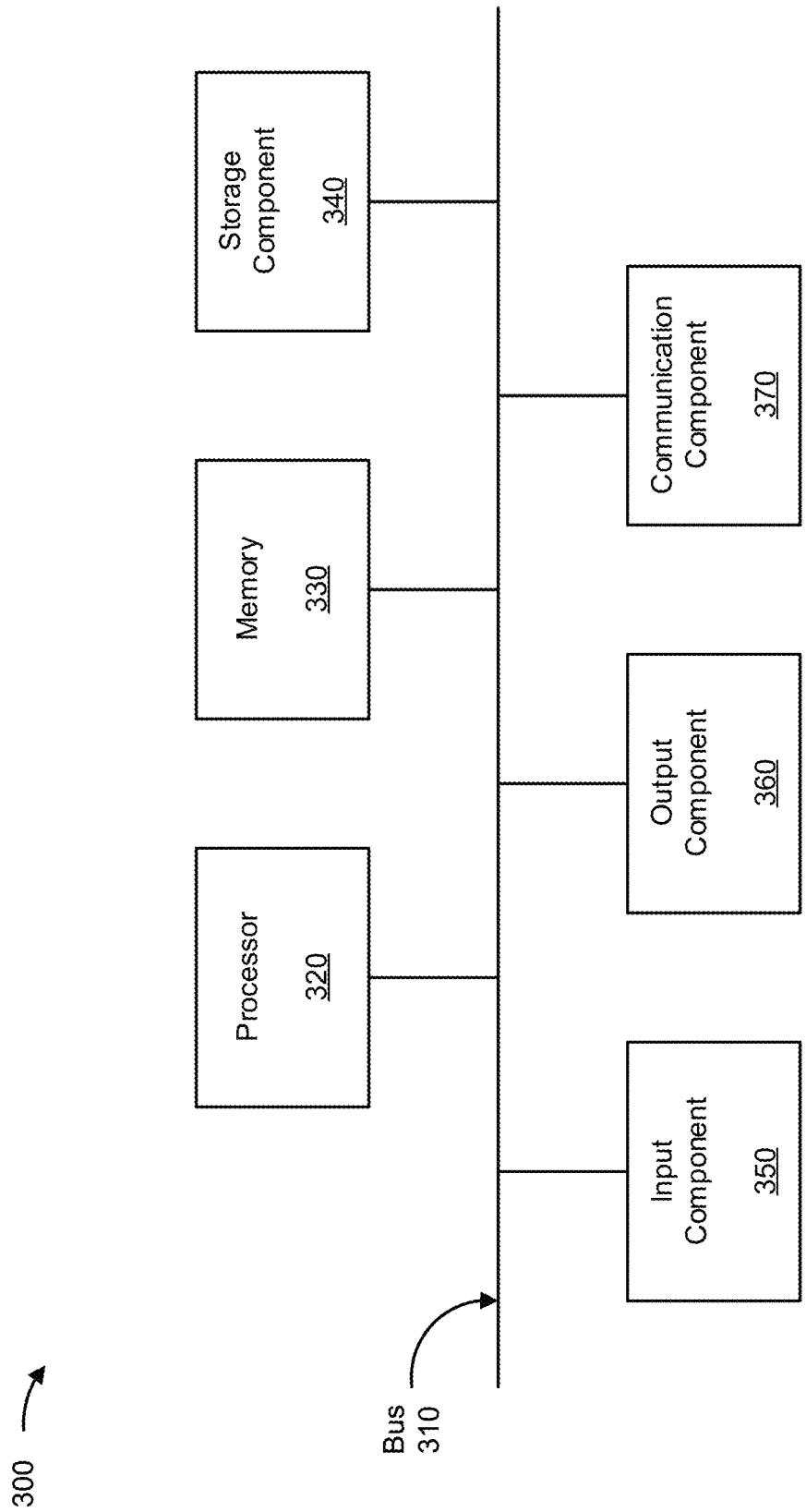
FIG. 3 is a diagram of example components of one or more devices of FIG. 2.

FIG. 3 is a diagram of example components of a device 300, which may correspond to transaction data source 210, data cleansing platform 220, and/or client device 230. In some implementations, transaction data source 210, data cleansing platform 220, and/or client device 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with maintaining a dataset based on periodic cleansing of raw source data. In some implementations, one or more process blocks of FIG. 4 may be performed by a data cleansing platform (e.g., data cleansing platform 220). In some implementations, one or more process blocks of FIG. 4 may be performed by another device or a group of devices separate from or including the data cleansing platform, such as the transaction data source 210 and/or the client device 230. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include obtaining a raw dataset that includes a set of data records generated during a first time period (block 410). In some implementations, each data record in the raw dataset includes a corresponding set of field values that uniquely identifies a respective entity associated with that data record. As further shown in FIG. 4, process 400 may include generating a cleansed dataset associated with the first time period (block 420). In some implementations, the cleansed dataset associates each data record, in the set of data records, with a corresponding entity key determined based on field values for a data record, in the raw dataset, corresponding to that entity key. As further shown in FIG. 4, process 400 may include generating, based on a set of uncleansed data records generated during a second time period that begins after an end of the first time period, a delta dataset that associates each uncleansed data record, in the set of uncleansed data records, with a corresponding entity key determined based on field values for a data record, in the set of uncleansed data records, corresponding to that entity key (block 430). As further shown in FIG. 4, process 400 may include performing a data join to update the cleansed dataset to include data records generated during the first time period and data records generated during the second time period (block 440).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for periodically cleansing raw source data, the system comprising:
   one or more memories; and
   one or more processors, communicatively coupled to the one or more memories, configured to:
      generate, based on a set of uncleansed data records generated during a second time period that begins after an end of a first time period, a delta dataset that associates each uncleansed data record, in the set of uncleansed data records, with a corresponding entity key determined based on field values for a data record, in the set of uncleansed data records, corresponding to that entity key; and
      perform a data join to update a cleansed dataset to combine data records generated during the first time period and data records generated during the second time period based on identifying a match with the corresponding entity key.

2. The system of claim 1, wherein the one or more processors are further configured to:
   publish a lookup table based on the delta dataset.

3. The system of claim 2, wherein the one or more processors are further configured to:
   perform a data deduplication process to verify that the lookup table includes no more than one variation of each entity key.

4. The system of claim 1, wherein each uncleansed data record comprises one or more fields associated with one or more of:
   information associated with a customer,
   information associated with a merchant, or
   information associated with a transaction between the customer and the merchant.

5. The system of claim 1, wherein the uncleansed data records include new or updated entity keys that do not appear in a prior lookup table of entity keys used to generate the cleansed dataset.

6. The system of claim 1, wherein the delta dataset is periodically generated.

7. The system of claim 1, wherein the entity key comprises a combination of fields associated with one or more of:
   a name associated with a merchant,
   a location associated with the merchant, or
   a category code associated with the merchant.

8. A method, comprising:
   generating, by a system and based on a set of uncleansed data records generated during a second time period that begins after an end of a first time period, a delta dataset that associates each uncleansed data record, in the set of uncleansed data records, with a corresponding entity key determined based on field values for a data record, in the set of uncleansed data records, corresponding to that entity key; and
   performing, by the system, a data join to update a cleansed dataset to combine data records generated during the first time period and data records generated during the second time period based on identifying a match with the corresponding entity key.

9. The method of claim 8, further comprising:
   publishing a lookup table based on the delta dataset.

10. The method of claim 9, further comprising:
    performing a data deduplication process to verify that the lookup table includes no more than one variation of each entity key.

11. The method of claim 8, wherein each uncleansed data record comprises one or more fields associated with one or more of:
   information associated with a customer,
   information associated with a merchant, or
   information associated with a transaction between the customer and the merchant.

12. The method of claim 8, wherein the uncleansed data records include new or updated entity keys that do not appear in a prior lookup table of entity keys used to generate the cleansed dataset.

13. The method of claim 8, wherein the delta dataset is periodically generated.

14. The method of claim 8, wherein the entity key comprises a combination of fields associated with one or more of:
   a name associated with a merchant,
   a location associated with the merchant, or
   a category code associated with the merchant.

15. A non-transitory computer-readable medium storing a set of instructions, the set of instructions comprising:
   one or more instructions that, when executed by one or more processors of a system, cause the system to:
      generate, based on a set of uncleansed data records generated during a second time period that begins after an end of a first time period, a delta dataset that associates each uncleansed data record, in the set of uncleansed data records, with a corresponding entity key determined based on field values for a data record, in the set of uncleansed data records, corresponding to that entity key; and
      perform a data join to update a cleansed dataset to combine data records generated during the first time period and data records generated during the second time period based on identifying a match with the corresponding entity key.

16. The non-transitory computer-readable medium of claim 15, wherein the one or more instructions further cause the system to:
   publish a lookup table based on the delta dataset.

17. The non-transitory computer-readable medium of claim 16, wherein the one or more instructions further cause the system to:
   perform a data deduplication process to verify that the lookup table includes no more than one variation of each entity key.

18. The non-transitory computer-readable medium of claim 15, wherein each uncleansed data record comprises one or more fields associated with one or more of:
   information associated with a customer,
   information associated with a merchant, or
   information associated with a transaction between the customer and the merchant.

19. The non-transitory computer-readable medium of claim 15, wherein the uncleansed data records include new or updated entity keys that do not appear in a prior lookup table of entity keys used to generate the cleansed dataset.

20. The non-transitory computer-readable medium of claim 15, wherein the delta dataset is periodically generated.

* * * * *